US012718820B1

(12) United States Patent
Andress et al.

(10) Patent No.: US 12,718,820 B1
(45) Date of Patent: Aug. 25, 2026

(54) MULTI-MODALITY ACTIVE SPEAKER DETECTION

(71) Applicant: Amazon Technologies, Inc., Seattle, WA (US)

(72) Inventors: Mark Andress, Seattle, WA (US); Andrew David Cross, Seattle, WA (US); Saurabh Gupta, Seattle, WA (US); Michael Mark Goodwin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 306 days.

(21) Appl. No.: 18/345,768

(22) Filed: Jun. 30, 2023

(51) Int. Cl.

| | |
|---|---|
| ***G10L 17/00*** | (2013.01) |
| ***G06V 20/40*** | (2022.01) |
| ***G10L 17/10*** | (2013.01) |
| ***G10L 25/21*** | (2013.01) |
| ***G10L 25/57*** | (2013.01) |
| ***G10L 25/60*** | (2013.01) |
| ***H04L 47/2416*** | (2022.01) |
| ***H04N 7/15*** | (2006.01) |
| ***H04N 7/18*** | (2006.01) |

(52) U.S. Cl.
CPC .............. *G10L 17/10* (2013.01); *G06V 20/49* (2022.01); *G10L 25/21* (2013.01); *G10L 25/57* (2013.01); *G10L 25/60* (2013.01); *H04L 47/2416* (2013.01); *H04N 7/183* (2013.01)

(58) Field of Classification Search
CPC ....................................................... G10L 25/78
See application file for complete search history.

(56) References Cited

U.S. PATENT DOCUMENTS

| | | | | |
|---|---|---|---|---|
| 9,100,540 | B1 * | 8/2015 | Gates | H04N 7/15 |
| 2002/0101505 | A1 * | 8/2002 | Gutta | H04N 7/15 348/E7.083 |
| 2011/0093273 | A1 * | 4/2011 | Lee | H04L 65/4038 348/E7.083 |
| 2014/0118472 | A1 * | 5/2014 | Liu | H04M 3/563 348/14.09 |

(Continued)

OTHER PUBLICATIONS

Anonymous, "Use Microsoft Teams Intelligent Speakers to identify in-room participants in a meeting transcription", Microsoft, in 17 pages. Retrieved online: https://support.microsoft.com/en-us/office/use-microsoft-teams-intelligent-speakers-to-identify-in-room-participants-in-a-meeting-transcription-a075d6c0-30b3-44b9-b218-556a87fadc00#bkrnk_notes [Downloaded on Dec. 28, 2023].

*Primary Examiner* — Jialong He
(74) *Attorney, Agent, or Firm* — KNOBBE, MARTENS, OLSON & BEAR, LLP

(57) ABSTRACT

A computing device may receive communication data associated with each of a plurality of communication devices in a first physical location, wherein first communication data received from a first communication device of the plurality of communication devices comprises first modality data in a first modality and second modality data in a second modality. A computing device may determine based on first modality data that the first communication device is a candidate device for identifying an active speaker. A computing device may determine based on second modality data that the first communication device is associated with the active speaker. A computing device may transmit speaker data regarding the active speaker to a second computing system in a second physical location.

19 Claims, 5 Drawing Sheets

(56) References Cited

U.S. PATENT DOCUMENTS

| | | | | |
|---|---|---|---|---|
| 2018/0358034 | A1* | 12/2018 | Chakra | G10L 25/78 |
| 2023/0068798 | A1* | 3/2023 | Etchart | G06T 7/74 |
| 2023/0206621 | A1* | 6/2023 | Ayanoglu | H04L 12/1813<br>382/190 |
| 2023/0260551 | A1* | 8/2023 | Aher | G06F 3/165<br>386/285 |
| 2023/0388355 | A1* | 11/2023 | Faulkner | G06F 3/04815 |

* cited by examiner

MULTI-MODALITY ACTIVE SPEAKER DETECTION

BACKGROUND

Computing systems can utilize communication networks to facilitate communications. In some implementations, one computing system manages communications between a first location and a second location over the communication network. The computing system may identify, for example by displaying a name of an active speaker in the first location, where the active speaker is a participant in the meeting currently speaking. The identification of the active speaker may be based on a volume level of audio information received by a first computing device communicating over the communication network being the highest volume level received by any computing device communicating over the communication network.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
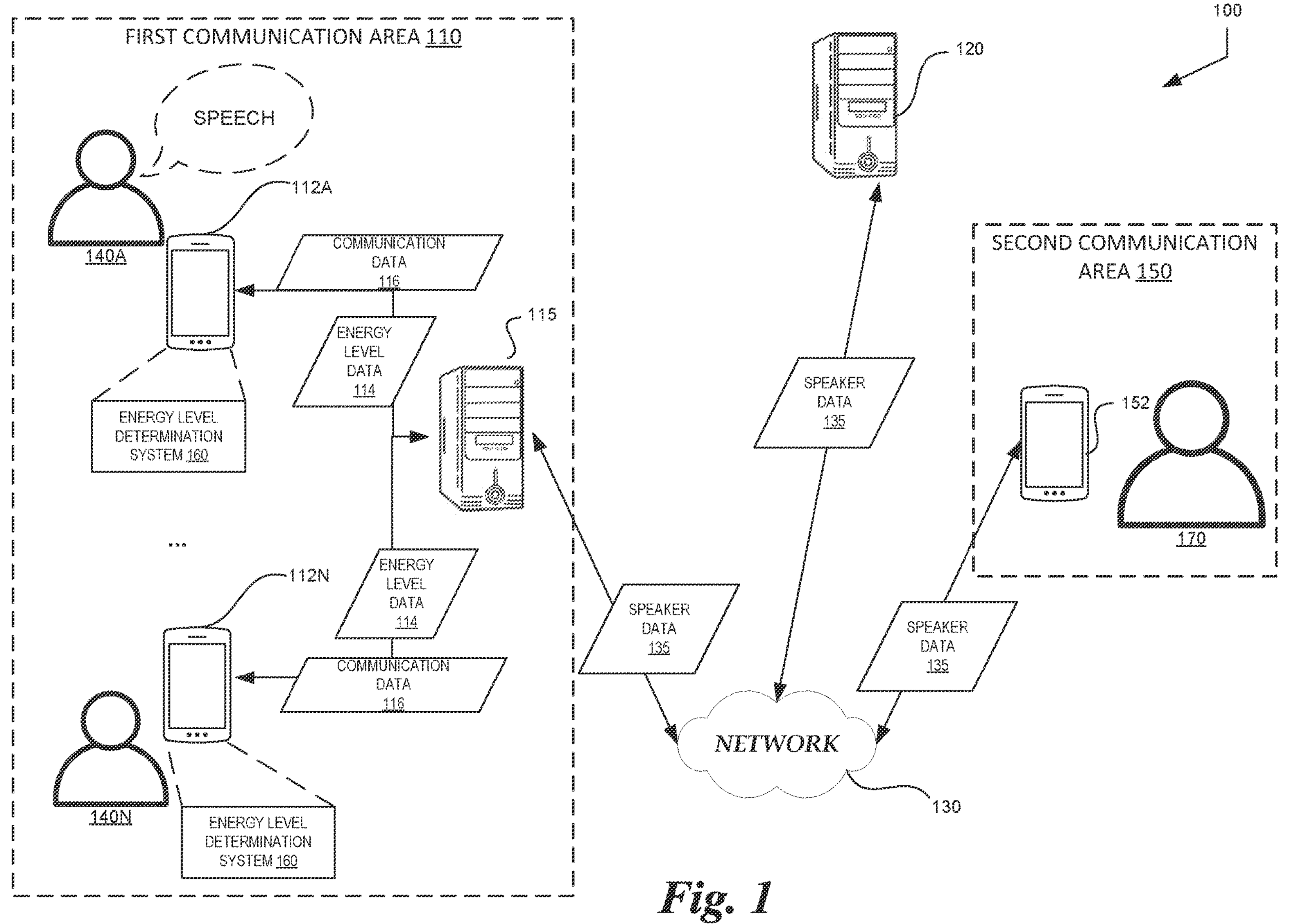
FIG. 1 is a diagram of illustrative data flows within an example system for two-phased active speaker detection according to some embodiments.

The present disclosure relates to the detection of an active speaker and identification of a computing device associated with the active speaker from among a plurality of computing devices. The system may identify the computing device by first comparing information of a first modality (e.g., audio or visual) to identify a first set of candidate computing devices that may be associated with an active speaker. The system may then identify the computing device or computing devices associated with an active speaker by comparing information of a second modality (e.g., different from the first modality) from the first set of candidate computing devices.

Some conventional communication systems allow for the identification of an active speaker in a communication facilitated by the communication system. One or more individuals currently speaking may be considered an active speaker. The identification of the active speaker(s) in some systems may be determined based on comparing a volume level of audio information received by each computing device to every other computing device involved in the communication. The device receiving audio information with the highest volume may then be determined by the system to be associated with the active speaker, and the device may be used to identify the active speaker. The identification may, for example, be indicated by adding a border around a video of the active speaker, highlighting a window associated with the active speaker, or presenting a name associated with the active speaker to other participants in the communication. Where there are a large number of participants in the communication, the comparison of each device's audio information to every other device may be inefficient and cause a delay in the identification of the active speaker.

Conventional systems implementing a communication system allowing communication between a first location and a second location may allow for a plurality of potential speakers to be located at the first location and/or the second location. In some conventional systems, there may be a plurality of computing devices (e.g., communication devices, smartphone devices, tablet computing devices, laptop computing devices, etc.) arranged in the first location. The arrangement may be decided by the participants, such as by setting down a computing device belonging to a participant in front of and proximal to the participant.

In some conventional systems, the arrangement of devices in the first location may be such that two or more devices, each associated with different participants in the communication, are located close enough to each other to receive audio, video, or other input information from the same participant. When two or more devices each receive input information from one participant, these conventional systems may be unable to correctly identify the active speaker. For example, where a first participant device and a second participant device are each located substantially the same distance from the active speaker, conventional systems may identify the wrong device as associated with the active speaker based on, as described above herein, a volume level of received audio information. Additionally, conventional systems in this example may rapidly switch between identifying each of the first participant device and the second participant device as being associated with the active speaker, creating confusion for communication participants located in a remote location.

Some aspects of the present disclosure address some or all of the issues noted above, among others, by using information indicating the location of each computing device in a first location, and input data in multiple modes of perception or modes communication (also referred to herein as modalities) to determine an active speaker. For example, a plurality of candidate speakers and a plurality of computing devices may be located in the first location. A communication management system in the first location (e.g., a communication server, a laptop computer, or other computing device managing communication between the first location and a remote location) may store information indicating the location of each computing device of the plurality of computing devices in the first location, and the candidate speaker of the plurality of candidate speakers associated with each computing device. The communication management system may receive a communication signal from each computing device of the plurality of computing devices. The communication signal from a given computing device may comprise data in multiple modalities, including at least first modality data (e.g., audio data) and second modality data (e.g., video data). In some examples, data for one or more of the modalities may be processed data received from the associated computing device, or data that is processed after receipt from the associated computing device. For example, the first modality data from each computing device may be energy level data determined by each computing device, where the energy level data indicates the energy level of audio information received by the corresponding computing device. In some embodiments, the energy level data may represent a gain associated with audio information received by a computing device. In some embodiments, the energy level data may be determined based on filtered or transformed audio data, for example the energy level may be determined based on only the portion of the audio data associated with speech information. The communication management system may then compare the first modality data received from each computing device to determine a candidate computing device associated with the highest energy level. The communication management system may preliminarily determine that the candidate computing device associated with the highest energy level is associated with the active speaker. Advantageously, each computing device may have performed processing on the received audio information to generate the first modality data, reducing the computational burden on the communication management system and in some cases allowing for a more computationally efficient, and faster, identification of a computing device associated with an active speaker.

In some embodiments, the communication management system may then identify a set of computing devices nearby the candidate computing device. For example, the communication management system may identify computing devices that are adjacent to the candidate computing device or are within a threshold physical distance from the candidate computing device using the location information of the plurality of computing devices stored in the communication management system. The threshold distance may, for example, be a fixed threshold distance used throughout the communication facilitated by the communication management system, or a dynamic threshold distance. In some embodiments, the dynamic threshold distance may be determined based on the first modality data. For example, where the first modality data is energy level data, the threshold distance may be determined based on the maximum energy level received from the plurality of computing devices, such that a greater maximum energy level leads to a greater threshold distance than a lesser maximum energy level.

In some embodiments, the communication management system may identify a set of computing devices nearby the candidate computing device based on energy level data received by the communication management system. For example, the communication management system may identify computing devices that are nearby the candidate device based on comparing the received energy level data from the candidate device to the received energy level data of each of the remaining plurality of computing devices. In some examples, a threshold difference between the candidate device's energy level data and the energy level data of the remaining computing devices of the plurality of computing devices may be used to determine computing devices nearby the candidate computing device. The threshold difference may be static or dynamic. Where the threshold is dynamic, the threshold may change in response to, for example, a maximum energy level value of the energy level data received from the candidate computing device, an average energy level value of the energy level data received from the candidate computing device, an average energy level value of the energy level data receive from each of the plurality of computing devices, or any other value useful for determining which of the plurality of computing devices are nearby the candidate computing device.

In some embodiments, the communication management system will compare second modality data from the set of computing devices within the threshold distance from the candidate computing device. The second modality data may comprise video information, such as the output of cameras of the set of computing devices. The communication management system may then analyze the second modality data of each computing device of the set of computing devices to determine which computing device is most likely being used by the active speaker. For example, where the second modality data comprises video information, the communication management system may analyze the video information for the presence of a face, and the presence of a moving mouth or lips. In some embodiments, the communication management system may comprise a first machine learning model configured to determine, based on video information, the presence of a face. In some embodiments, the communication management system may comprise a second machine learning model configured to determine, based on video information, the movement of a mouth or lips. In some embodiments, the first machine learning model may be the same as the second machine learning model. The communication management system may use second modality data for various lengths of time (e.g., 100 milliseconds, 1 second, 3 seconds, etc.), where the length of time of second modality data used is based on the length of time necessary to determine the presence of the active speaker.

In an illustrative example, the communication management system may determine, based on the presence of a moving mouth or lips in the video information, that the candidate computing device previously identified based on the first modality data (e.g., audio-based energy) is most likely to be associated with the active speaker. In some examples, the second modality data of the candidate computing device may not indicate the presence of a moving mouth or lips. In these examples, a second computing device of the set of computing devices located withing the threshold distance of the candidate computing device may be determined to be transmitting second modality data indicating moving mouth or lips. The communication management system may then determine the second computing device is most likely to be associated with the active speaker, even though the first computing device may have been designated as the candidate computing device capturing the highest audio-based energy level. In some examples, the communication management system may determine that second modality data received from the candidate computing device and the set of computing devices within the threshold distance of the candidate computing device do not indicate moving mouths or lips. In these examples, the communication management system may then compare first modality data received from each of the plurality of computing devices in the first location at a time different from (e.g., subsequent to) the time the previously compared first modality data was compared to determine a second candidate computing device and a second set of computing devices within a threshold distance from the second candidate computing device. The communication management system may then compare second modality data as described above for the second candidate computing device and the second set of computing devices to determine the computing device associated with the active speaker.

In some embodiments, after determining the device associated with the active speaker, the communication management system may transmit communication data to a third-party system, or to a computing device located in a second location. The communication management system may transmit communication data received from the computing device associated with the active speaker, for example audio information and video information. Alternatively, the communication management system may transmit communication data received from two or more computing devices in the first location, for example video information from the computing device associated with the active speaker and audio data from a second computing device determined to have a higher quality audio data signal (e.g., where the communication management system determines the computing device associated with the active speaker transmits noisy audio data).

In some embodiments, the communication management system may transmit audio information from a microphone located in the first location, where the microphone is not associated with any participant or computing system of the plurality of computing systems. For example, the communication management system may transmit video information from a camera located in the first location, where the camera is not associated with any participant or computing system of the plurality of computing systems. Alternatively, the communication management system may combine audio information from two or more microphones located in the first location, where the each of the two or more microphones may be associated with a computing device of the plurality of computing devices or may be unassociated, to generate an augmented audio signal for transmission. In some embodiments, the communication management system may modulate the audio data and/or the video data received from one or more computing devices of the plurality of computing devices to comply with a requirement for receiving audio data and/or video data of the third-party system. Alternatively, the communication management system may alter the video information to be transmitted by adding a border around the active speaker. In some embodiments, the communication management system may transmit a plurality of video data streams associated with two or more participants located in the first location. In such embodiments, the communication management system may store information of a current and a previous active speaker. The communication management system may then draw a thicker, darker, or otherwise more visually engaging border around the current active speaker and a thinner, lighter, or otherwise less visually engaging borer around the previous active speaker. In some embodiments, the communication management system may transmit a signal to a third-party system indicating an audio and/or video stream associated with an active speaker.

As will be appreciated by one of skill in the art, in light of the present disclosure, the embodiments disclosed herein improve the ability of computing systems to efficiently and correctly identify an active speaker from among a plurality of candidate speakers in a first location. Moreover, the presently disclosed embodiments address technical problems inherent within computing systems; specifically, the need to rapidly determine the identity of the active speaker to facilitate seamless communication between the first location and a second location. These technical problems are addressed by the various technical solutions described herein, including distributing computation of a particular modality of data (e.g., audio data) among a plurality of computing devices communicating with a communication management system, thereby lowering the processing required at the communication management system when determining the active speaker. Thus, the present disclosure represents an improvement to computing systems participating in or managing multi-participant communication sessions, and computing systems in general.

Various aspects of the disclosure will be described with regard to certain examples and embodiments, which are intended to illustrate but not limit the disclosure. Although aspects of some embodiments described in the disclosure will focus, for the purpose of illustration, on particular examples of modalities, audio information, video information, and the like, the examples are illustrative only and are not intended to be limiting. In some embodiments, the techniques described herein may be applied to additional or alternative modalities. Additionally, any feature used in any embodiment described herein may be used in any combination with any other feature or in any other embodiment, without limitation.

Example Two-Phased Active Speaker Detection

With reference to an illustrative example, FIG. 1 shows data flows within an example two-phased active speaker detection system 100. The two-phased active speaker detection system 100 comprises a plurality of computing devices 112A-112N positioned proximally to a plurality of candidate speakers 140A-140N, and a communication management system 115 located within a first communication area 110 (e.g., a first physical location). The two-phased active speaker detection system 100 further comprises a meeting platform server 120, a remote computing device 152 and remote user 170 located in a second communication area 150 (e.g., a second physical location distinct from the first physical location), and a network 130 in communication with the communication management system 115, the meeting platform server 120, and the remote computing device 152.

In some embodiments, individual computing devices of the plurality of computing devices 112A-112N comprise an energy level determination system 160 configured to determine an energy level data 114 of received audio information (e.g., an amplitude of a sound wave). Further, the plurality of computing devices 112A-112N transmit the energy level data 114 determined by each respective computing device's energy level determination system 160 to the communication management system 115. In some embodiments, the energy level determination system 160 of, for example, first computing device 112A may be the same energy level determination system 160 used by the second computing device 112N. Alternatively, the energy level determination system 160 used by the first computing device 112A may be different from the energy level determination system 160 used by the second computing device 112N, for example where the available processing, memory, or network resources of the first computing device 112A differ from the available processing, memory, or network resources of the second computing device 112N.

In some embodiments, the plurality of computing devices 112A-112N transmit communication data 116 to the communication management system 115. The communication data 116 may comprise a communication signal. For example, a communication signal may comprise one or more of audio information, video information, and other interaction information (e.g., a screen sharing information, input information, reaction information, etc.) associated with a meeting being conducted between the first communication area 110 and the second communication area 150. In some embodiments, the communication data 116 may be transmitted from the communication management system 115 to the meeting platform server 120 via the network 130.

Alternatively, the communication data 116 may be transmitted by the communication management system 115 to the remote computing device 152 via the network 130. In some embodiments, the communication data 116 may be modified by the communication management system 115 to conform to a specification of the meeting platform server 120, the remote computing device 152 or any other specification of the system providing for communication between the first communication area 110 and the second communication area 150 such that a receiving computing device may correctly interpret the speaker data 135 or the communication data 116. In additional embodiments, the communication data 116 may be transmitted from the communication management system 115 of the first communication area 110 to a second communication management system (not shown) located in the second communication area 150, where the second communication system performs some or all of the same functions in the second communication area 150 as the communication management system 115 performs in the first communication area 110.

In some embodiments, the speaker data 135 may be transmitted between the communication management system 115, the network 130, the meeting platform server 120, and the remote computing device 152. The speaker data 135 may, in some examples, comprise a preliminary or candidate identification of an active speaker (e.g., a first candidate speaker 140A), and the communication data 116 from one or more computing devices identified as part of a set of candidate computing devices associated with the active speaker. The speaker data 135 may comprise active speaker identifier data for a set of candidate speakers (e.g., first candidate speaker 140A and second candidate speaker 140N), and may indicate that any of the set of candidate speakers may be the active speaker.

In some embodiments, the communication management system 115 may be configured to determine an active speaker from among the plurality of candidate speakers 140A-140N. For example, the communication management system 115 may receive information for a first modality (e.g., energy level data 114) from the plurality of computing devices 112A-112N. In this example, the communication management system 115 may then compare the energy level data 114 from each of the plurality of computing devices 112A-112N to generate a comparison result. The comparison result may then be used by the communication management system 115 to determine a set of candidate computing devices, where the candidate computing devices are the most likely to be a computing device nearest to the active speaker (e.g., first candidate speaker 140A). The communication management system 115 may then, in some embodiments, use data of a second modality to determine the computing device nearest the active speaker from the set of candidate computing devices. For example, the communication management system 115 may receive video information from the plurality of computing devices 112A-112N as part of the communication data 116 received from each device. The communication management system 115 may then analyze the video data from the communication data 116 of each of the set of candidate computing devices to look, for example, for video data indicating a candidate speaker's mouth is moving. Based on the identification of the communication device transmitting communication data 116 comprising video data where a candidate speaker's mouth is moving, the communication management system 115 may then identify the transmitting computing device as the computing device nearest the active speaker. Based on the determination of the computing device nearest the active speaker, the communication management system 115 may, in some embodiments, transmit speaker data 135 comprising communication data 116 from the determined computing device to the network 130 and then to the meeting platform server 120 or the second communication area 150.

In some embodiments, the communication management system 115 may modify the communication data 116 before transmitting the speaker data 135 to the network 130. For example, the communication management system 115 may add a border around the video data of the communication data 116 to indicate the video data is associated with the active speaker, such as by adding the border around an image of the active speaker in the video data. In some examples, communication data 116 received from multiple devices of the plurality of computing devices 112A-112N may be transmitted as speaker data 135 to the network 130. Where communication data 116 from more than one computing device is transmitted, the communication management system 115 may alter the data from each computing device. For example, the communication management system 115 may add a border to each of the video data of the communication data 116, but add a thicker or differently colored border to the video data of the first computing device 112A associated with the active speaker (e.g., first candidate speaker 140A).

In some embodiments, the meeting platform server 120 is configured to facilitate communication between the first communication area 110 and the second communication area 150. In some embodiments, the meeting platform server 120 may be a third-party system running third-party communication software (e.g., ZOOM®, MICROSOFT TEAMS®, AMAZON CHIMER, etc.), or implementing a transmission protocol (e.g., WebRTC). The meeting platform server 120 may be configured to only accept one set of communication data 116 from the communication management system 115, and the communication management system 115 may selected the communication data 116 from a most likely device associated with the active speaker from among a plurality of candidate devices, where the most likely device is determined based on data of a first modality. The communication management system 115 may then determine by a second modality the same or a new most likely device associated with the active speaker, and transmit the communication data 116 received by the communication management system 115 from the most likely device as determined based on the second modality to the meeting platform server 120.

In some embodiments, a communication management system may additionally be located in the second communication area 150 and perform some or all of the same functions as the communication management system 115 of the first communication area 110 (e.g., when there are a plurality of candidate speakers located in the second communication area 150).

Figure 2A:
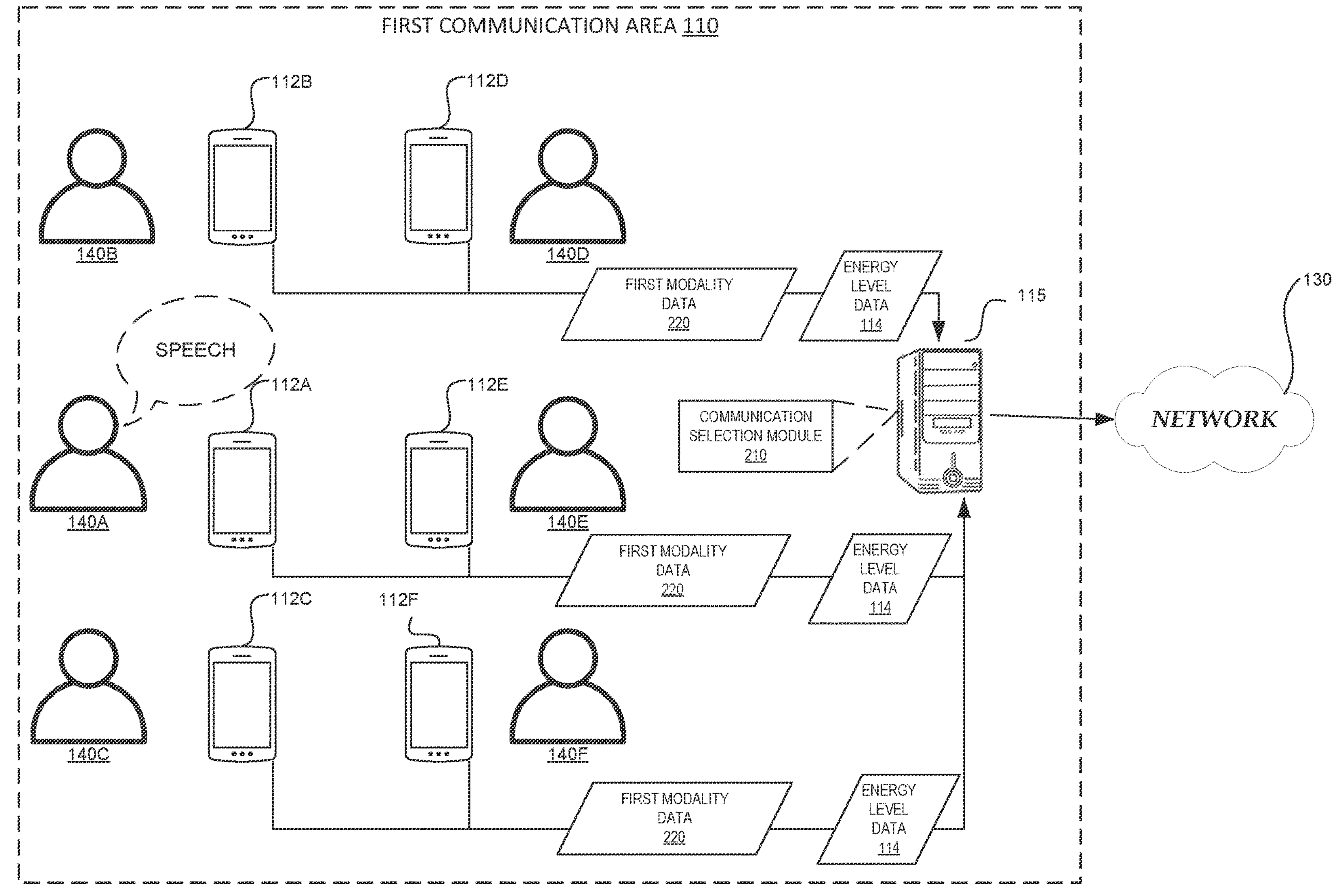
FIG. 2A is a diagram of an illustrative example of a first phase of a two-phased active speaker detection routine according to some embodiments.
Figure 2B:
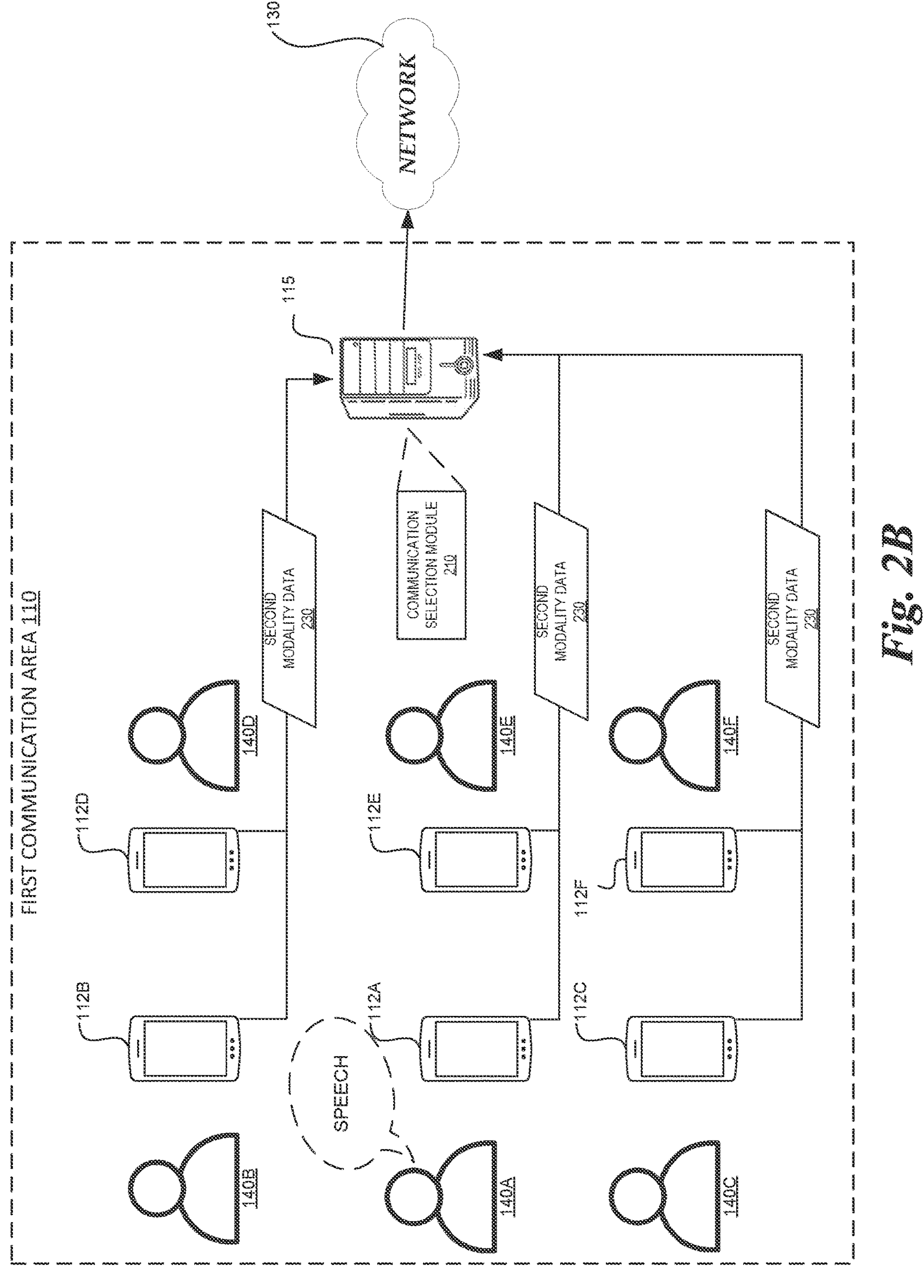
FIG. 2B is a diagram of an illustrative example of a second phase of a two-phased active speaker detection routine according to some embodiments.

FIGS. 2A and 2B illustrate example data flows in a two-phased active speaker detection system. FIG. 2A illustrates example data flows for determining a set of candidate devices associated with the active speaker based on a first modality and will be discussed along with FIG. 2B which illustrates example data flows for determining a most likely device associated with the active speaker from among the set of candidate devices based on a second modality. While the data flows shown in FIGS. 2A and 2B are unidirectional from the plurality of computing devices 112B-112F to the communication management system 115, other data not shown, for example data being exchanged to facilitate a meeting, may flow in both directions.

In some embodiments, communication data 116 is received by at least one of the computing devices 112A-112F. The communication data 116, as noted previously herein, may comprise a communication signal associated with one or more modalities, for example audio information (e.g., speech), video information, touch information, or other information associated with a communication, such as a meeting. The communication data 116 may be of varying timeframes associated with the length of time (e.g., 1 second, 2 minutes, etc.) a user (e.g., first candidate speaker 140A) communicates through a computing device (e.g., first computing device 112A) associated with the two-phased active speaker detection system 100.

As the two-phased active speaker detection system 100 operates, some or all of the computing devices 112A-112F transmit communication data 116 comprising the communication signal, the communication signal comprising first modality data 220 and second modality data 230 to the communication management system 115. In some embodiments, the first modality data 220 comprises audio information. In embodiments where the first modality data 220 comprises audio information, some or all of the computing devices 112A-112F may determine energy level data 114. The energy level data 114 may be determined by, as described above, an energy level determination system 160 of the computing devices 112A-112F. The energy level determination system 160 of a computing device (e.g., first computing device 112A) may receive audio information from an input of the computing device (e.g., a microphone of first computing device 112A). The energy level determination system 160 may then determine an energy level of the audio information (e.g., an amplitude of the sound wave received by first computing device 112A). The energy level determination system 160 may output a determined energy level as a decibel value, a relative number compared to a baseline of the first communication area 110 where the computing devices 112A-112F are located, or as any other representation of the volume associated with the audio information received by a computing device.

In some embodiments, such as where the first modality data 220 is a type of information different from audio information, for example touch or video information, the energy level data 114 may not be transmitted to the communication management system 115 by the computing devices 112A-112F.

When the communication management system 115 has received first modality data 220 and, where the first modality data 220 is audio information, energy level data 114, the communication management system 115 may determine a set of likely speakers from among the plurality of candidate speakers 140A-140F and a set of likely computing devices associated with the set of likely speakers. The communication management system 115 may determine the set of likely speakers based on one or more of the first modality data 220, the energy level data 114, or additional information available to the communication management system 115. The additional information may include the layout of the first communication area 110, for example arrangement information indicating the physical location of each of the computing devices 112A-112F in the room, the positions of the plurality of candidate speakers 112A-112F, or information associated with the input components of the computing devices 112A-112F (e.g., a microphone type or sensitivity, a resolution of a camera, etc.). In some embodiments, the arrangement information may be determined, for example by the communication management system 115, based on a comparison of the audio information received from some or all of the computing devices 112A-112F. For example, if a person (e.g., first candidate speaker 140A) is speaking and the speech is detected by multiple microphones, the multiple microphones may be determined to be in the same location. The communication management system 115 may then determine, for example based on a volume level of the audio information received from each computing device associated with the multiple microphones, a set of relative distances between the multiple microphones. Alternatively, the arrangement information may be determined by the communication management system 115 using video information received from two or more cameras in the first communication area 110, for example based on video information parameters (e.g., field of view, frame rate, etc.). For example, if a person (e.g., first candidate speaker 140A) walks past a first camera, and then walks past a second camera, the distance between the first camera and the second camera may be inferred (e.g., by communication management system 115) based on the person's walking speed and/or time off camera. The walking speed, for example, may be determined based on one or more parameters of the first camera and the second camera, for example a field of view, or a frame rate. Where the person is identified as being within view of the first camera and the second camera simultaneously, the positions of the first camera and the second camera may be determined by triangulation, the triangulation of positions may use existing information associated with the location of the person, the first camera, or the second camera. In another example, a person may use a reference object of a known dimension (e.g., a square object known to be one foot wide and one foot high) to allow for the identification of the relative positions of the cameras. The reference object may have additional markings (e.g., black stripes of equal size and equal spacing apart on the reference object) to better allow for position determination. Additionally, the communication management system 115 may assign one or more of the plurality of computing devices 112A-112F and the candidate speaker associated with each of the computing devices as computing devices unlikely to be associated with an active speaker.

For the purpose of discussing FIGS. 2A and 2B only, computing devices 112A-112C will be considered to have been determined by the communication management system 115 as the set of computing devices most likely to be associated with the active speaker. As is clear from the above description, the selection of computing devices 112A-112C is for illustrative purposes only, and any of the plurality of computing devices 112A-112F may have been chosen as the set of computing devices most likely to be associated with the active speaker. Additionally, while three devices have been selected for this example by the communication management system 115, any number of computing devices may be selected in alternative examples or embodiments.

In some embodiments, the communication management system 115 selects, for example using a communication selection module 210, from the set of computing devices most likely to be associated with the active speaker a single device (e.g., second computing device 112B) most likely to be associated with the active speaker. For example, the energy level data 114 of first computing device 112A may comprise the highest energy level received from any of the computing devices in the first communication area 110. The communication management system 115 may then transmit a modality signal comprising the first modality data 220, the second modality data 230, and/or all received communication data from the first computing device 112A to the network 130.

In some embodiments, the communication signal is a composite signal comprising modality data received from a plurality of computing devices located in the first communication area 110. For example, the communication management system 115 may determine a video signal of a first computing device (e.g., first computing device 112A) is the only computing device among the set of candidate computing devices to contain a face. The communication management system 115 may then determine that a sound quality of an audio signal received from a second computing device (e.g., second computing device 112B) is better than an audio signal received from the first computing device, and decide to transmit the audio signal of the second device with the video signal of the first computing device in order to provide a better modality signal for a communication application (e.g., Zoom, Microsoft Teams, Amazon Chime, etc.).

When the set of candidate devices most likely to be associated with an active speaker has been determined, here computing devices 112A-112C, the communication management system 115 may then begin to analyze second modality data 230. The communication management system 115 may, in some embodiments, only analyze second modality data 230 received from computing devices 112A-112C. In some embodiments, the communication management system 115 may continue to analyze second modality data 230 received from all of the computing devices in the first communication area 110.

As discussed previously herein, the second modality data 230 may be audio information, video information, input information (e.g., a touch input), screen sharing information, or any other data associated with the communication being received by the communication management system 115 from a computing device.

The communication management system 115 may then determine, based on the second modality data 230, a computing device associated with the active speaker from among the previously determined set of most likely computing devices associated with an active speaker. For example, where the second modality data 230 is video information, the communication management system 115 may be configured to identify that the second modality data 230 indicates a face actively engaged in speech. In some examples, this may be determined based on the movement of a mouth identified by the communication management system 115 in the second modality data 230 received from a computing device. In some examples, the presence of an active speaker may be determined by the overall motion of a face identified by the communication management system 115 in the second modality data 230 received from a computing device. In some examples, more than one active speaker may be identified by the communication management system 115 as being present in the second modality data 230 received from a computing device, for example where a panel of speakers is captured by a video input of one computing device. In some examples, two or more speakers may be identified, each speaker associated with a different computing device, and the communication management system 115 may then identify each computing device associated with a speaker as a device associated with an active speaker.

In some embodiments, the communication management system 115 may then, for example by the communication selection module 210, select a new modality signal to transmit to the network 130. In some embodiments, the modality signal transmitted by the communication management system 115 to the network 130 is the same modality signal transmitted to the network 130 previously. Alternatively, the communication selection module 210 of the communication management system 115 may select a new modality signal to transmit to the network 130. For example, where the device previously selected as most likely to be associated with the active speaker by the communication selection module 210 (e.g., second computing device 112B) is not the device determined to be associated with the active speaker based on the second modality data 230 (e.g., first computing device 112A). As discussed previously herein, the modality signal transmitted by the communication management system 115 to the network 130 may, in some embodiments, be a composite signal. After the determination by the communication management system 115 based on the second modality data 230, the modality signal transmitted to the network 130 may continue to be a composite signal. For example, where the audio information received from the computing device associated with the active speaker is unclear, audio information of a nearby device may be combined with the video signal of the computing device associated with the active speaker for transmission.

In some embodiments, one or more input devices (e.g., microphones, video cameras, etc.) may be arranged in the first communication area 110 to capture input from the first communication area 110. The input devices may not be associated with any candidate speaker in the first communication area 110, but the input signal may be used by the communication selection module 210 of the communication management system 115 to produce a composite signal for transmission to the network 130. For example, a high-quality microphone may be positioned in the middle of the first communication area 110 and capture an audio signal of higher quality than the audio signal captured by the computing device associated with the active speaker. This higher quality audio signal may be combined with a video signal of the computing device associated with the active speaker into a composite signal and transmitted to the network 130.

Example Two-Phased Active Speaker Detection Routine

Figure 3:
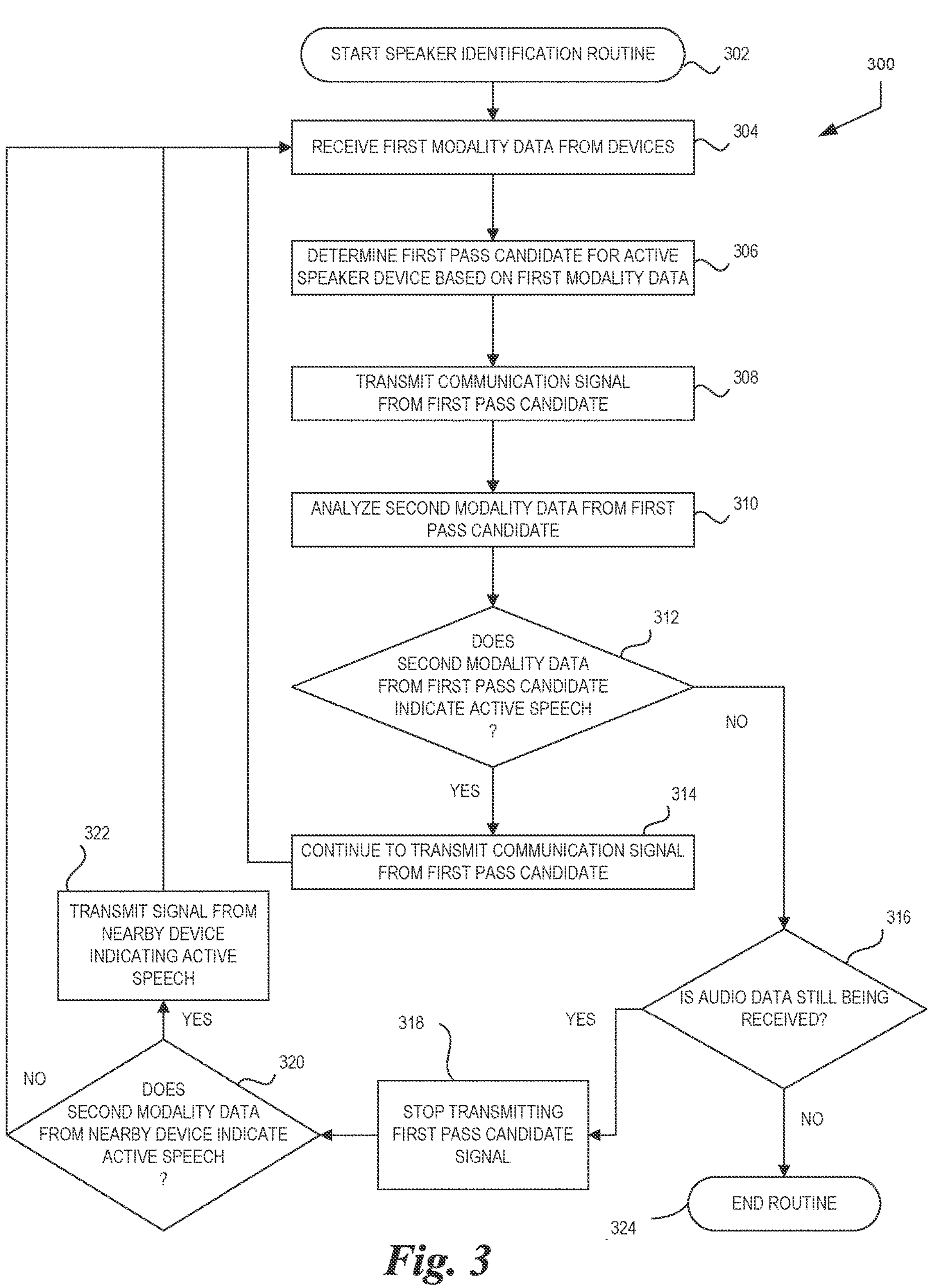
FIG. 3 is a flow diagram of an illustrative routine for determining a device associated with an active speaker according to some embodiments.

FIG. 3 illustrates an example routine 300 for performing two-phased active speaker identification using a two-phased active speaker detection system 100. The routine 300 will be discussed herein in reference to operation on a communication management system 115, but may be performed on any computing device operating as part of the two-phased active speaker detection system 100.

Routine 300 begins at block 302. In some embodiments, routine 300 begins in response to the opening of a communications application which may be in communication with the communication management system 115. Alternatively, routine 300 may begin in response to input of a user of, for example the first computing device 112A. Alternatively, routine 300 may begin in response to the start time of a meeting or other event for which start time information is stored on a device connected to the communication management system 115. Alternatively, routine 300 may begin in response to an acoustic sensor of the first computing device 112A, such as a microphone, detecting sound. When the routine 300 begins, executable instructions may be loaded to or otherwise accessed in computer-readable memory and executed by one or more processors, such as the memory and processors of the first computing device 112A described in greater detail below in reference to FIG. 4.

At block 304, first modality data is received from the computing devices in communication with the communication management system 115, where the communication devices are located in the first communication area 110. As discussed previously herein, first modality data may be received as part of a modality signal and selected from the modality signal. The first modality data may comprise, for example, audio information, video information, input information, screen sharing information, and the other information received from the computing devices. When first modality data has been received from the devices, the routine 300 moves to block 306.

At block 306, the communication management system 115 determines a first pass candidate for the device associated with an active speaker based on the first modality data received at block 304, for example as described with respect to FIGS. 2A and 2B. In some embodiments, one first pass candidate may be selected from among the plurality of computing devices 112A-112N in the first communication area 110. In some embodiments, a plurality of first pass candidates may be selected from among the plurality of computing devices 112A-112N in the first communication area 110. In some embodiments, a plurality of first pass candidates may be selected from among the plurality of computing devices 112A-112N in the first communication area 110 and a further determination by the communication management system 115 may identify a first pass most likely computing device associated with the active speaker from among the plurality of first pass candidates. The first pass most likely computing device associated with the active speaker may be selected, for example, so that the communication management system 115 may transmit the modality signal received from the first pass most likely computing device associated with the active speaker to the network 130. In some embodiments, the first pass most likely computing device associated with the active speaker is selected by the communication management system 115, and then additional information about the first communication area 110, such as the arrangement of computing devices within the first communication area 110, is used to determine the remainder of the plurality of first pass candidate computing devices associated with the active speaker. For example, the communication management system 115 may select a single first pass candidate computing device, and then room information of the first communication area 110 may be used by the communication management system 115 to identify computing devices closest to the first pass candidate computing device, such that computing devices within a certain radial distance of the first pass candidate computing device are included in a plurality of first pass candidate computing devices associated with the active speaker. When one or more first pass candidate computing devices have been determined by the communication management system 115, the routine 300 may move to block 308. In some embodiments, the routine 300 may move directly to block 310.

When the routine 300 moves from block 306 to block 308, the communication selection module 210 of the communication management system 115 may transmit the communication signal received from the first pass candidate for the computing device most likely to be associated with the active speaker to the network 130. In some embodiments, as discussed in relation to FIGS. 2A and 2B, the communication signal transmitted from the communication selection module 210 to the network 130 may be the communication signal received from one computing device (e.g., the first pass candidate), or may be a composite signal comprising information received from the communication signal of a plurality of computing devices or independent input devices (e.g., a central microphone positioned in the first communication area 110). The routine 300 then moves to block 310.

At block 310, the communication management system 115 analyzes second modality data received from one or more first pass candidate computing devices as part of the received modality signals. In some embodiments, the second modality data is of a different modality than the first modality data. For example, where the first modality data used by the communication management system 115 was audio data, the second modality data may be video or input data, but not audio data. The second modality data is analyzed by the communication management system 115 to determine whether the first pass candidate for computing device associated with the active speaker is the computing device associated with the active speaker. When the analysis of the second modality data is complete, the routine 300 moves to block 312.

At decision block 312, the communication management system 115 decides whether the analysis of the second modality data from the first pass candidate computing device at block 310 indicates that the first pass candidate is the computing device associated with the active speaker. If the analysis indicates the first pass candidate is associated with the active speaker, the routine 300 moves to block 314. If the communication management system 115 determines, based on the second modality data, that the first pass candidate is not associated with the active speaker, the routine 300 moves to block 316.

At block 314, the communication management system 115 continues to transmit the modality signal from the first pass candidate to the network 130, and the routine 300 returns to block 304.

At block 316, the communication management system 115 determines whether the modality signals received from the plurality of computing devices in the first communication area 110 indicate that audio data continues to be received. If no audio data is received by the communication management system 115, then the routine 300 moves to block 324 and the routine 300 ends. If audio data is still being received by the communication management system 115 in the modality signal from at least one computing device in the first communication area 110, the routine 300 may move to block 318 if the routine 300 had previously moved to block 308, otherwise the routine 300 moves to block 320.

At block 318, the communication management system 115 may, optionally, stop transmitting the modality signal from the first pass candidate, or the composite signal generated by the communication selection module 210 of the communication management system 115. This may be advantageous where, for example, the modality signal from the first pass candidate comprised noise. For example, when an energy level data 114 caused the communication management system 115 to select the first pass candidate, and the energy level data 114 was caused by excessive audio noise received by an input of the first pass candidate, it may be preferable for the communication selection module 210 to determine that no audio data should be transmitted to the network 130 until after a second computing device different from the first pass candidate has been selected by the communication management system 115 based on the second modality data.

At block 320, the communication management system 115 determines whether the second modality data received from devices nearby the first pass candidate computing device indicates active speech is being captured by the nearby device. As discussed previously, nearby devices may be determined based on position or location information stored, for example, by the communication management system 115 or transmitted from each of the plurality of computing devices 112A-112N in the first communication area 110. If second modality data of nearby devices does not indicate active speech, the routine 300 returns to block 304.

In some embodiments, a video signal of a device nearby the first pass candidate device may comprise a face with moving lips, indicating the face captured by the nearby device is speaking. In some embodiments, screen sharing data may be transmitted from a nearby computing device, and the communication management system 115 may determine based on receiving screen sharing data from the nearby device that the nearby device is associated with the active speaker. When the communication management system 115 determines that the received second modality data of a nearby device indicates speech, the routine 300 moves to block 322.

At block 322, the communication selection module 210 of the communication management system 115, or another component of the communication management system 115, transmits the modality signal received from the nearby device to the network 130. As discussed previously herein, the communication management system 115 may, in some embodiments, transmit a composite signal generated based in part on the modality signal of the nearby device to the network 130. The communication management system 115 then continues to transmit the signal to the network 130 and returns to block 304 to continue the routine 300 until the communication management system 115 determines audio data is no longer being received in the modality signals received from the plurality of computing devices 112A-112N at block 316 and the routine 300 moves to block 324 and ends.

Execution Environment

Figure 4:
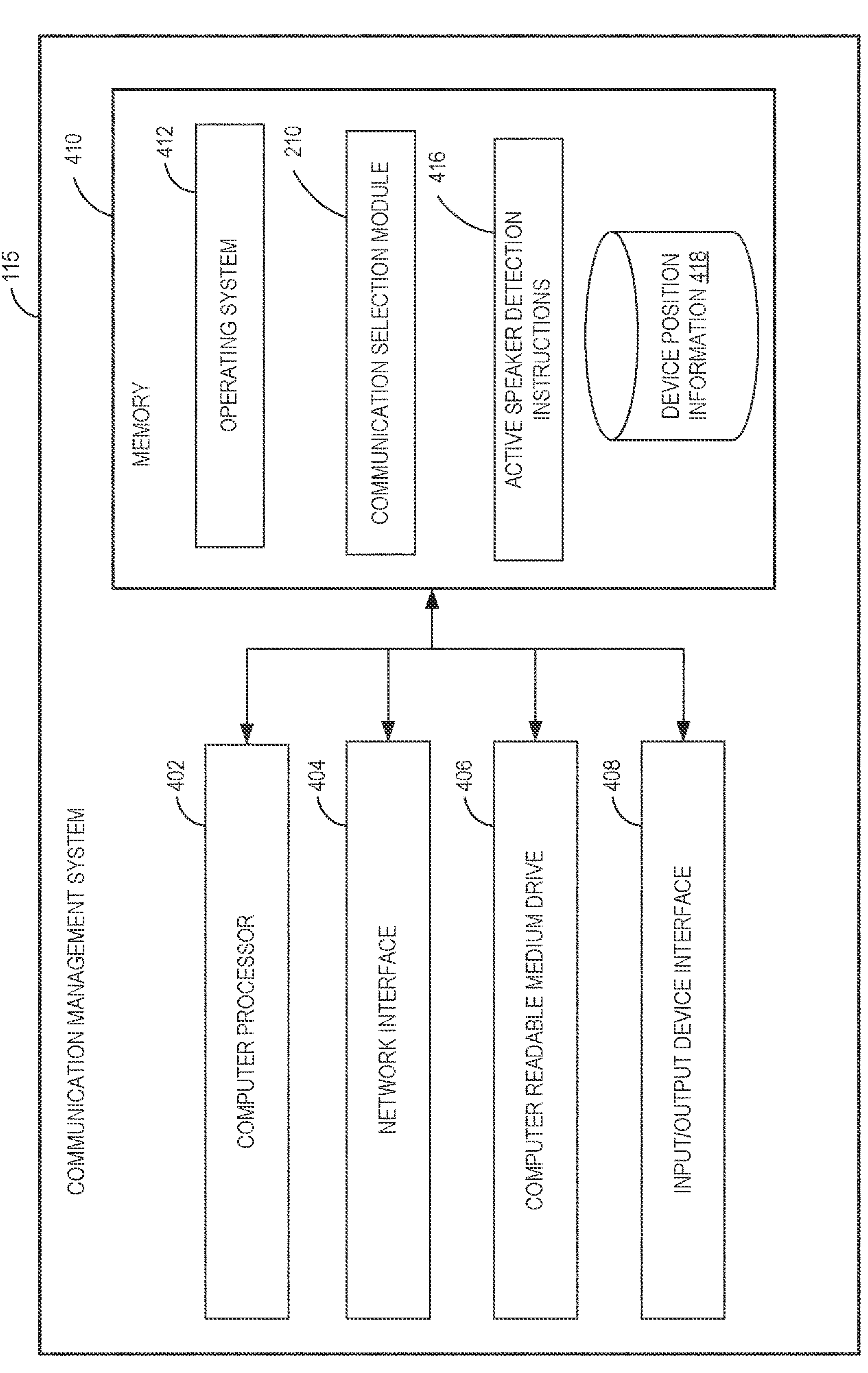
FIG. 4 is a block diagram of an illustrative communication management system configured to implement aspects of the present disclosure according to some embodiments.

FIG. 4 illustrates various components of an example communication management system 115.

In some embodiments, the communication management system 115 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the communication management system 115 may be implemented as web services consumable via one or more communication networks. In further embodiments, the communication management system 115 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a communication management system 115 may include: one or more computer processors 402, such as physical central processing units ("CPUs"); one or more network interfaces 404, such as a network interface cards ("NICs"); one or more computer readable medium drives 406, such as a high density disk ("HDDs"), solid state drives ("SSDs"), flash drives, and/or other persistent non-transitory computer readable media; one or more input/output device interfaces; and one or more computer-readable memories 410, such as random access memory ("RAM") and/or other volatile non-transitory computer readable media.

The computer-readable memory 410 may include computer program instructions that one or more computer processors 402 execute and/or data that the one or more computer processors 402 use in order to implement one or more embodiments. For example, the computer-readable memory 410 can store an operating system 412 to provide general administration of the communication management system 115. As another example, the computer readable memory 410 can store a communication selection module 210 for selecting data from modality signal received by the communication management system 115, for example audio data and video data, to transmit to a network 130. As another example, the computer-readable memory 410 can store an active speaker detection instructions 416 for determining one or more first pass candidate computing devices associated with an active speaker based on received modality signals, and computing devices nearby the one or more first pass candidate computing devices. As another example, the computer-readable memory 410 can store computing device position information 418 comprising, for example, relative positioning of computing devices and input devices in a first communication area 110 for use by the active speaker detection instructions 416 in determining nearby computing devices.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may." "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X. Y. Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

computer-readable memory storing arrangement information regarding a physical arrangement of a first device, a second device, and a third device; and one or more processors configured by executable instructions to:

receive first communication data generated by the first device, second communication data generated by the second device, and third communication data generated by the third device, the first communication data comprising first audio information, first video information, and first energy level data for the first device, the second communication data comprising second audio information, second video information, and second energy level data for the second device, and the third communication data comprising third audio information, third video information, and third energy level data for the third device;

compare the first energy level data, the second energy level data, and the third energy level data to determine a device associated with a highest energy level;

select the first device, based on a determination the first device is the device associated with the highest energy level;

determine, based on the arrangement information, a location of the first device;

select, based on the location of the first device, the second device, wherein the second device is selected based on being closest to the first device according to the arrangement information;

analyze the first video information received from the first device, and the second video information received from the second device to determine a presence of an active speaker;

select, based on analyzing the first video information and the second video information, the first device as being associated with the presence of the active speaker; and transmit audio information of the first communication data received from the first device.

2. The system of claim 1 wherein analyzing the video information comprises analyzing the first video information and the second video information using a machine learning model configured to identify active speech.

3. The system of claim 1 wherein the first energy level data of the first device is associated with a volume level of the audio information of the first device.

4. The system of claim 1, wherein the one or more processors are further configured by the executable instructions to:

alter the first video information of the first communication data received from the first device to add a border around the active speaker in the first video information to generate modified video information; and transmit the modified video information.

5. A computer-implemented method comprising:

as implemented by a first computing system comprising one or more processors configured to execute specific instructions, receiving communication data associated with each of a plurality of communication devices in a first physical location, wherein first communication data received from a first communication device of the plurality of communication devices comprises first modality data in a first modality and second modality data in a second modality;

determining, based on the first modality data, that the first communication device is a candidate device for identifying an active speaker;

determining a second communication device of the plurality of communication devices is a second candidate device for identifying the active speaker based on comparing a first location associated with the first communication device to a second location associated with the second communication device to determine the second communication device is within a threshold distance of the first communication device;

determining, based on data of at least one of the first modality or the second modality, received from the second communication device, the second communication device is not associated with the active speaker;

determining, based on the second modality data, that the first communication device is associated with the active speaker; and transmitting speaker data regarding the active speaker to a second computing system in a second physical location, wherein the speaker data comprises an identifier associated with the active speaker.

6. The computer-implemented method of claim 5 wherein the first modality data comprises audio information; and wherein the computer-implemented method further comprises:

transmitting the audio information to the second computing system in the second physical location.

7. The computer-implemented method of claim 6 further comprising modulating the audio information to conform to a specification of the second computing system.

8. The computer-implemented method of claim 6 wherein determining that the first communication device is the candidate device based on the first modality data comprises:

comparing a first energy level of the first modality data to a second energy level associated with a second communication device of the plurality of communication devices in the first physical location to generate a comparison result, wherein determining the first communication device is the candidate device is based on the comparison result.

9. The computer-implemented method of claim 5 wherein the second modality data comprises video information; and wherein the computer-implemented method further comprises:

transmitting the video information to the second computing system in the second physical location.

10. The computer-implemented method of claim 9, wherein determining, based on the second modality data, that the first communication device is associated with the active speaker comprises identifying active speech in the video information of the second modality data.

11. The computer-implemented method of claim 10, wherein identifying active speech in the video information comprises:

analyzing the video information using a machine learning model configured to identify active speech to generate an output; and determining, based on the output of the machine learning model, the video information indicates active speech.

12. The computer-implemented method of claim 5, further comprising:

receiving audio information from a microphone in the first physical location;

associating the audio information with the communication data of the first communication device; and transmitting the audio information to the second computing system in the second physical location.

13. The computer-implemented method of claim 5, further comprising:

receiving video information from a camera in the first physical location;

associating the video information with the communication data of the first communication device; and transmitting the video information to the second computing system in the second physical location.

14. The computer-implemented method of claim 5, further comprising:

identifying a first location of the first communication device, and a third location of a third communication device based on communication device location information indicating a relative location of the plurality of communication devices in the first physical location;

determining that the second communication device is the second candidate device for identifying the active speaker based on comparing the first location and the location associated with the second communication device to determine the second communication device is within a threshold distance of the first communication device;

determining, based on the first location and the third location, the third communication device is outside the threshold distance of the first communication device; and determining, based on data of the second modality received from the second communication device, the second communication device is not associated with the active speaker.

15. The computer-implemented method of claim 5, further comprising:

transmitting video information received from the first communication device to the second computing system;

determining, based on a comparison of first audio information received from the first communication device and second audio information received from a second communication device of the plurality of communication devices, the second audio information is of a higher quality than the first audio information; and transmitting audio information received from the second communication device to the second computing system.

16. A system comprising a computing device comprising:

a computer-readable memory and one or more processors, wherein the one or more processors are configured to:

receive communication data associated with each of a plurality of communication devices in a first physical location, wherein first communication data received from a first communication device of the plurality of communication devices comprises first modality data in a first modality and second modality data in a second modality;

determine, based on the first modality data, that the first communication device is a candidate device for identifying an active speaker;

determine a second communication device of the plurality of communication devices is a second candidate device for identifying the active speaker based on comparing a first location associated with the first communication device to a second location associated with the second communication device to determine the second communication device is within a threshold distance of the first communication device;

determine, based on data of at least one of the first modality or the second modality, received from the second communication device, the second communication device is not associated with the active speaker;

determine, based on the second modality data, that the first communication device is associated with the active speaker; and transmit speaker data regarding the active speaker to a second computing system in a second physical location, wherein the speaker data comprises an identifier associated with the active speaker.

17. The system of claim 16, wherein the second modality is different from the first modality, and wherein the first modality is one of: an audio modality, or a video modality.

18. The system of claim 16 wherein the first communication data comprises first audio information; and wherein the one or more processors are further configured to:

receive second communication data from a second communication device of the plurality of communication devices comprising second audio information;

combine the first audio information with the second audio information to generate augmented audio information; and transmit the augmented audio information to the second computing system.

19. The computer-implemented method of claim 5, further comprising:

identifying a first location of the first communication device, the location of the second communication device;

determining that the second communication device is a second candidate device for identifying the active speaker based on comparing the first location and the location; and determining, based on data of the second modality received from the second communication device, the second communication device is not associated with the active speaker.

* * * * *